United States Patent

Morikawa

[11] Patent Number: 5,811,145
[45] Date of Patent: Sep. 22, 1998

[54] METHOD AND APPARATUS FOR CONTINUOUSLY CUTTING AND DISCHARGING A CONSTANT AMOUNT OF BREAD DOUGH

[75] Inventor: Michio Morikawa, Utsunomiya, Japan

[73] Assignee: Rheon Automatic Machinery Co., Ltd., Utsunomiya, Japan

[21] Appl. No.: 796,614

[22] Filed: Feb. 7, 1997

[30] Foreign Application Priority Data

Feb. 17, 1996 [JP] Japan ................................. 8-054089

[51] Int. Cl.⁶ ........................... A21C 5/00; A21D 8/00
[52] U.S. Cl. ................... 426/503; 222/272; 222/281; 425/241; 425/298; 425/311; 426/518
[58] Field of Search ................... 426/506, 496, 426/518; 425/298, 311, 238, 241; 83/932; 222/272, 281; 366/41, 76.1, 181.1

[56] References Cited

U.S. PATENT DOCUMENTS 4,211,492 7/1980 Konig et al. ............................. 222/272
4,813,860 3/1989 Jonsson et al. ......................... 425/311

FOREIGN PATENT DOCUMENTS 28 19 512 11/1978 Germany.

Primary Examiner—George Yeung
Attorney, Agent, or Firm—Limbach & Limbach L.L.P.

[57] ABSTRACT

An apparatus is provided that can always and continuously cut and discharge a constant amount of bread dough, regardless of its properties, from a mass of bread dough in a hopper. The apparatus is characterized by projections (5,6) mounted on pairs of opposing rotating cutting blades (4,4') disposed in a bottom opening of the hopper (1).

7 Claims, 6 Drawing Sheets

METHOD AND APPARATUS FOR CONTINUOUSLY CUTTING AND DISCHARGING A CONSTANT AMOUNT OF BREAD DOUGH

FIELD OF THE INVENTION

This invention relates to a method and apparatus used in a process for forming a viscoelastic material such as bread dough for continuously cutting and discharging a constant quantity of bread dough etc. that is cut and discharged from a mass of mixed dough in a constant amount to be supplied to a later process.

A conventional type of apparatus for cutting and discharging bread dough by a rotary cutter is exemplified in U.S. Pat. No. 4,211,492, wherein bread dough in a hopper is cut by a pair of star-shaped rotary cutting blades. FIGS. 6 and 7 show another type of conventional apparatus.

The conventional rotary cutter as in FIGS. 6 and 7 has a mechanism wherein highly viscoelastic bread dough is cut by having it put between plate-shaped rotary blades 23,23'. Since the blades push bread dough beyond the peripheries of the rotating blades 23,23' when they rotate, the amount of cut bread dough differs piece-by-piece, so that in practice no constant amount of cut bread dough has been realized. In other words, some irregular unfilled spaces are formed around the circumferential areas of the blades, as in FIG. 7.

The inside flow b,b' of bread dough is generated such that the action of the surfaces of the rotating blades 23,23' caused by the rotation of their shafts 22,22' in the directions of arrows a,a' cause the flow of bread dough in a hopper 20 in those directions b,b'. As a result, when the outer surfaces of the blades 23,23' are moving along the loci a,a' of rotation, bread dough 2 in the hopper 20 is pushed up along the directions b,b' so that the weight of the cut bread dough 21' always fluctuates, and so that only a volume of bread dough can be cut that is far less than that which can be contained by the spaces surrounded by the rotating blades 23,23', forming the bottom of the hopper.

SUMMARY OF THE INVENTION

One purpose of this invention is to continuously cut bread dough in a hopper into pieces of a constant weight to continuously discharge them.

Another purpose of this invention is to provide a simple and convenient apparatus wherein a constant amount of highly viscoelastic bread dough is continuously cut by having the rotating cutting blades always accurately hold a constant amount of bread dough to be cut.

To achieve the above purposes the method of this invention uses a rotary cutter, wherein the bread dough in a hopper is cut and discharged through a bottom opening of the hopper by a rotary cutter comprising pairs of opposing rotary cutting blades disposed at the bottom opening. The method is characterized by the step of preventing bread dough from escaping upwards and drawing the bread dough in the hopper down during the rotation of the cutting blades by providing rotary cutting blades equipped with projections on front surfaces thereof so that a constant quantity of bread dough is always cut and discharged by the abutment and separation of the cutting blades.

The apparatus of this invention for continuously cutting and discharging bread dough is constituted such that the bread dough in a hopper 1 is cut and discharged through a bottom opening of the hopper by a rotary cutter comprising pairs of opposing rotary cutting blades 4 disposed at the bottom opening. It is characterized by projections 5,6 provided on front surfaces of the rotary blades 4 such that a constant quantity of bread dough can always be cut and discharged by eliminating slipping between the blades 4 and the bread dough. Thus, accuracy in measuring the cut bread dough is improved, and the discharge of the cut bread dough is made easy.

To achieve the purpose of this invention bar-shaped or needle-like projections that are provided on front surfaces of the blades at arbitrary intervals are effective. Plane eave-shaped or hoe-shaped projections that are provided on the blades along their longitudinal directions and in the directions of their tangents are also effective.

By using the thus-structured rotary cutter, the projections on the blades can prevent the bread dough in the hopper from escaping into the upper part of the hopper, and can draw the bread dough down from the hopper so that a structure can be obtained wherein a constant amount of cut bread dough can always be easily discharged.

DESCRIPTION OF THE PREFERRED EMBODIMENTS

Figure 1:
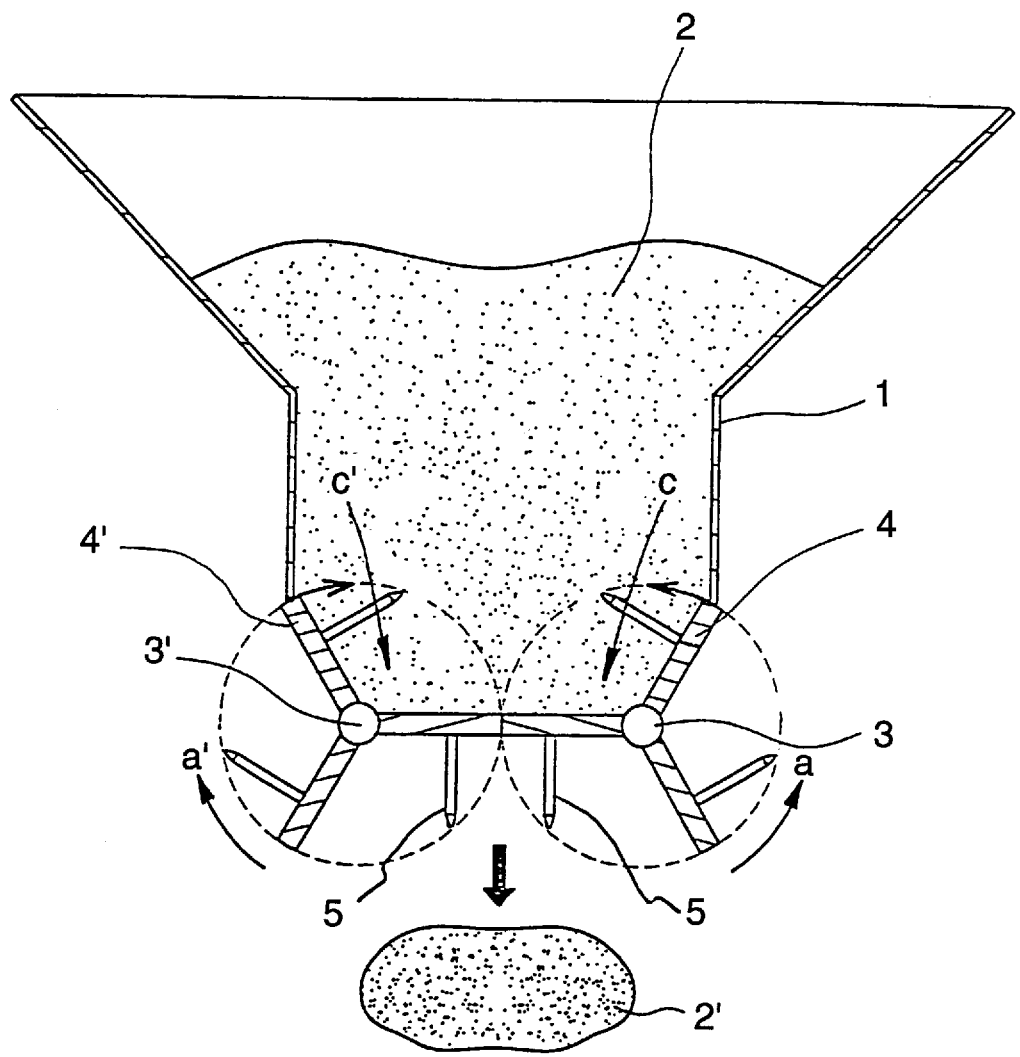
FIG. 1 is a side view of a first embodiment of this invention.

Based on examples some embodiments of this invention will now be described by reference to the drawings. FIG. 1 shows a first embodiment of this invention, wherein a hopper 1 accommodates bread dough 2, and arrows c,c' show the directions of the flow of the bread dough 2. Two opposing rotating shafts 3,3' are provided at a bottom opening of the hopper 1 with a constant and parallel interval provided therebetween.

Plate-shaped blades 4,4' of equal number are radially mounted on the peripheries of the rotating shafts 3,3' such that the peripheries of the blades 4,4' contact those of the counterpart blades by the opposing rotation of the opposite rotating shafts 3,3', so as to cut the bread dough 2 to discharge the cut bread dough 2' downwards.

Figure 2:
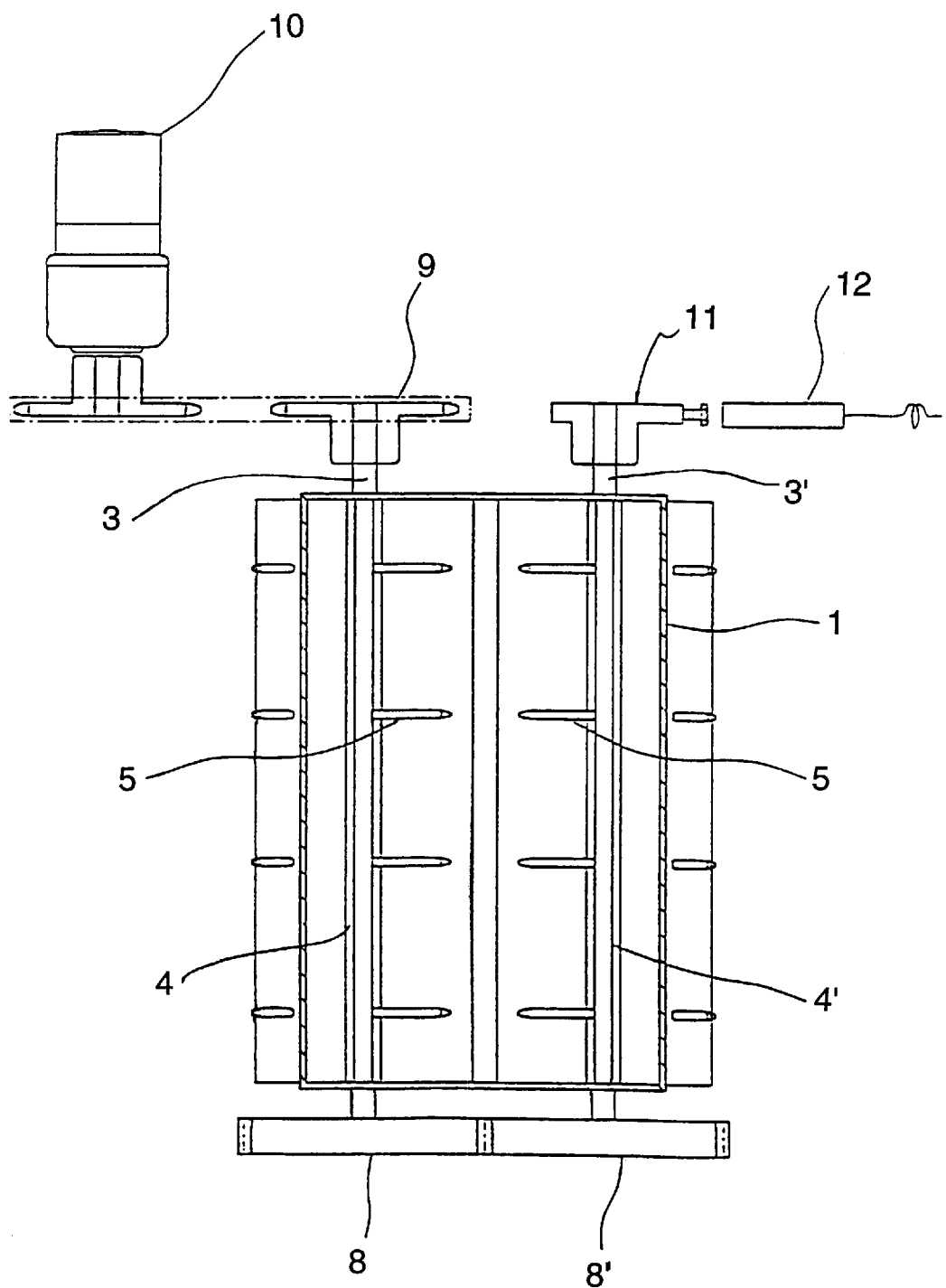
FIG. 2 is a plan of the first embodiment of this invention.

As shown in FIG. 2, well-known types of gears 8,8' and sprockets 9 are mounted on the rotating shafts 3,3', via which this conventional transmission means transmits the rotational force of a motor 10.

A cam 11 is fixed to the rotating shafts 3,3' so as to provide a proximity switch 12 for detecting the rotation of the cam 11.

The bottom part of the hopper 1 and the side parts adjacent thereto can be closed by placing opposingly-positioned blades 4 at its bottom opening so as to form a box-like shape.

In this closed box-like state the blades 4,4' are stopped from rotating. The position where the blades stop can be adjusted by the proximity switch 12 and the cam 11.

The operation of the embodiment will now be described. For every batch, kneaded and prepared bread dough 2 is transported as a unit in a mixer bowl (not shown), and manually or mechanically fed into the hopper 1 to be accommodated therein.

The blades 4,4' rotate while the bread dough is being retained in the hopper such that a given amount of bread dough is cut from the bread dough in the hopper 1 so as to feed a constant weight of a cut bread dough piece 2' into dough-forming means (not shown) thereunder.

When the blades 4,4' rotate while the bottom part of the hopper is being closed by means of them in a closed box-like state, bar-shaped projections 5 penetrate the bread dough 2 and hold it therebetween so that it can be forcedly pushed down to be cut and discharged by the movement of the blades 4,4'.

During this process the projections 5 can eliminate any slipping between the blades 4,4' and bread dough 2. The projections 5 cooperate with the front surfaces of the advancing blades 4,4' in pulling the bread dough down from its upper position to a lower position so that a constant volume of bread dough 2, defined by the closed box-like blades, can be cut by the abutting blades 4,4'.

Figure 3:
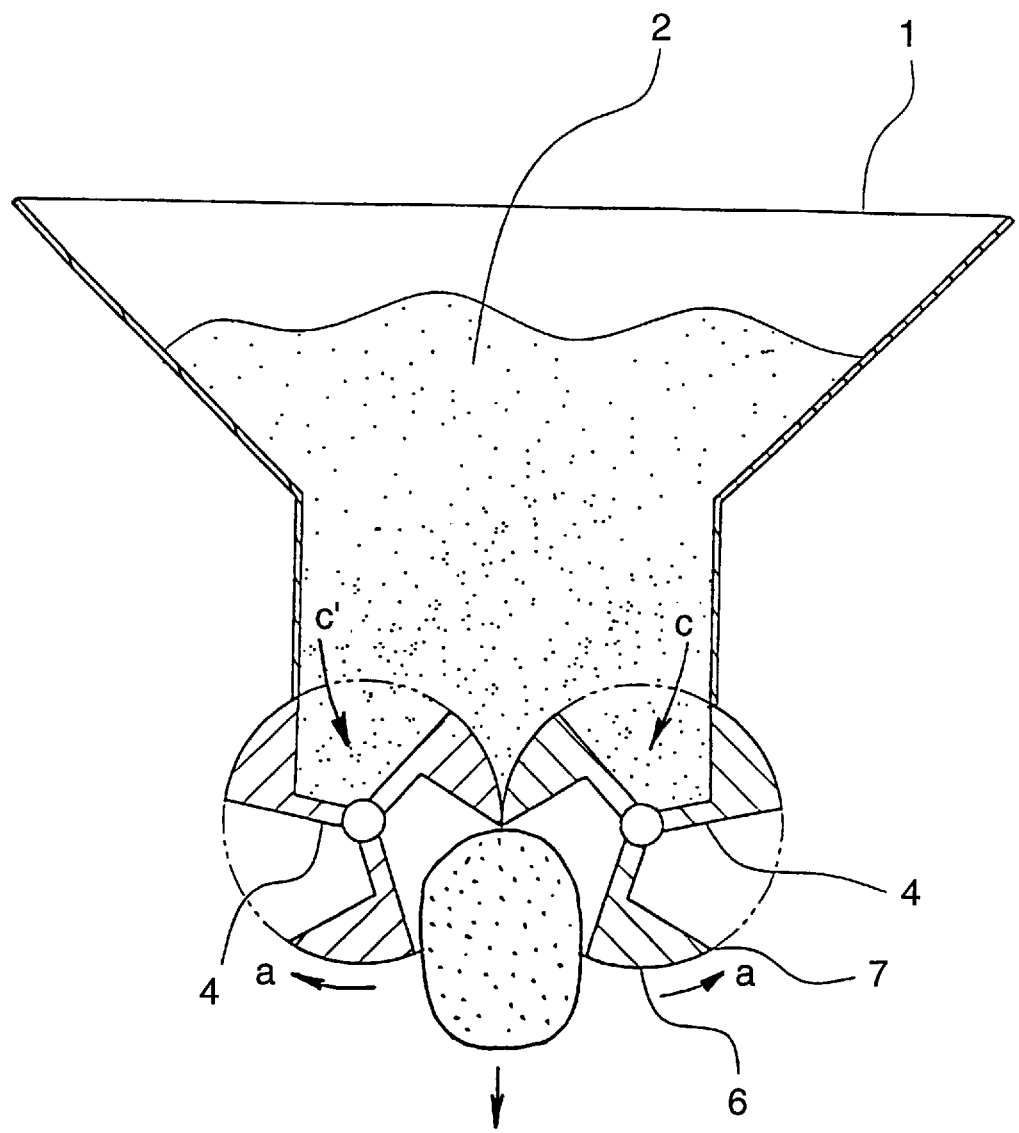
FIG. 3 is a side view of a second embodiment of this invention.
Figure 4:
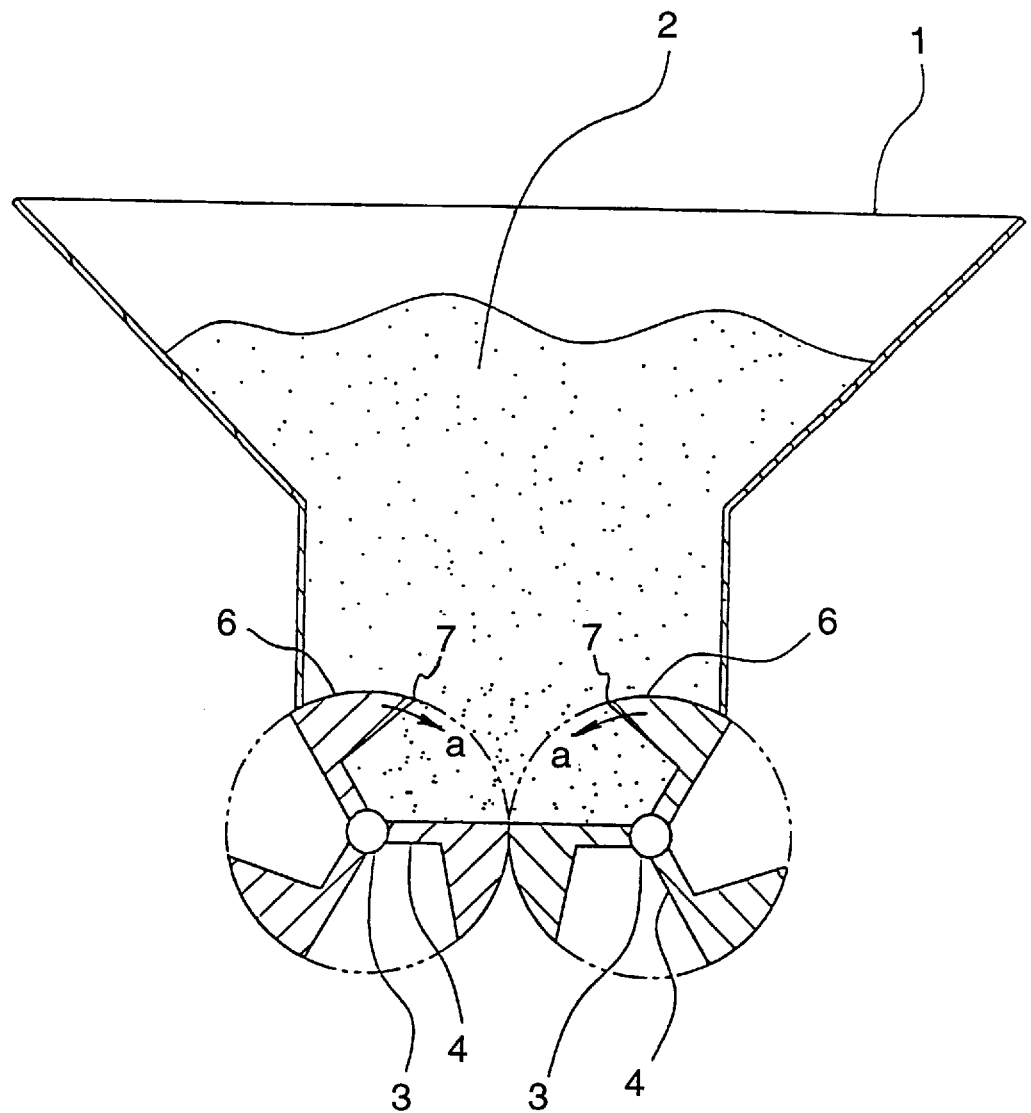
FIG. 4 is another side view of the second embodiment of this invention.
Figure 5:
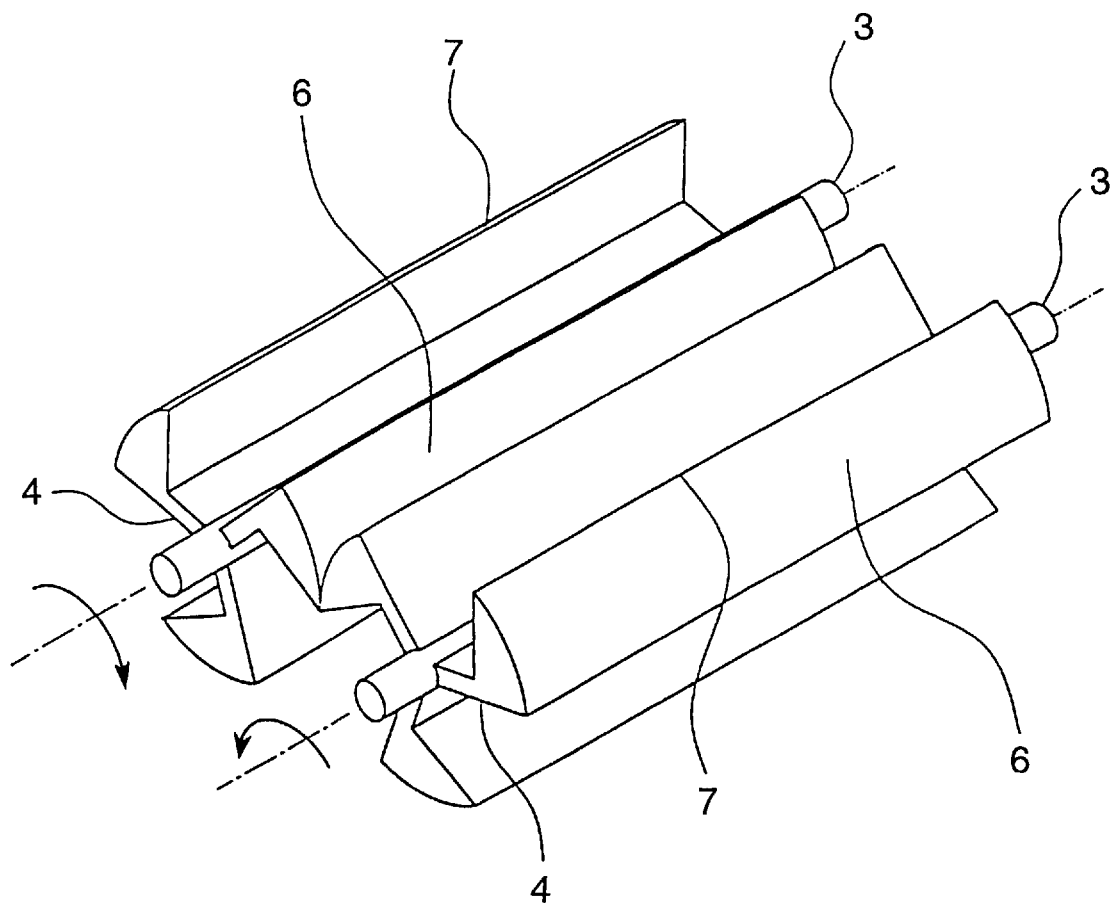
FIG. 5 is a perspective view of the second embodiment of this invention.
Figure 6:
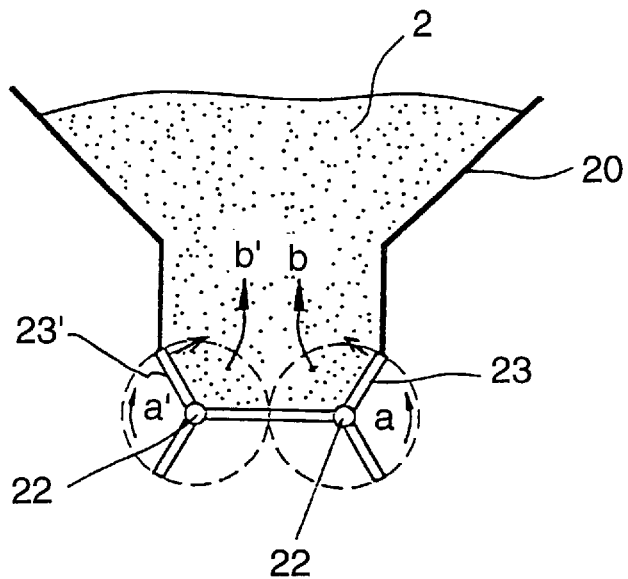
FIG. 6 is a side view showing the prior art.
Figure 7:
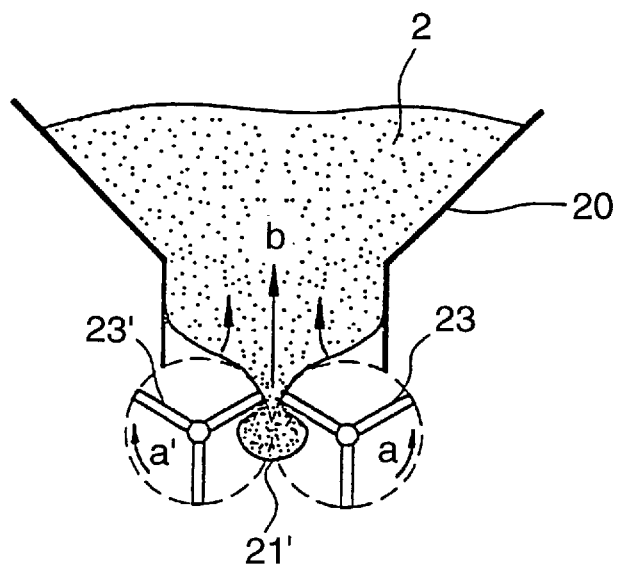
FIG. 7 is another side view showing the prior art.

A second embodiment of this invention will now be described by reference to FIGS. 3–5. Constituents like those of the first embodiment are designated by like marks, so that their explanations are omitted.

The bar-shaped projections mounted on the rotating blades 4 are replaced with hoe-shaped projections 6 having a hoe-like shape in section along the longitudinal direction of the blades 4. Since the hoe-shaped projections 6 are arranged in opposed relationships, when the blades 4 rotate the tips 7 of those projections 6 move in the directions of arrows "a" to hold the bread dough 2 therebetween to pull it down, so that it can be cut and discharged downwards.

As an alternative, to achieve the same effects, plane eave-shaped projections can also be provided on the blades instead of the hoe-shaped projections.

Although in the second embodiment one continuous projection along the longitudinal direction of the blade 4 is described, a plurality of comb-shaped projections with tips (not shown) can also be provided.

As stated above, the conventional apparatus has drawbacks in that the cut bread dough has no constant weight. This invention has succeeded in providing an apparatus with a simple structure that can always discharge a constant amount of cut bread dough pieces by having bar-shaped, hoe-shaped or plane eave-shaped projections mounted on the front surfaces of the cutting blades.

The cutting blades of this invention can securely hold therebetween bread dough to be cut by mounting bar-shaped or plate-shaped projections on the peripheries of their front surfaces so as to prevent the weight of cut bread dough from fluctuating.

As any number of bar-shaped projections can be mounted on the cutting blades, and as the number can be changed if necessary, the best cutting conditions can be achieved by selecting an appropriate number of bar-shaped projections according to the properties of the bread dough used.

The plane eave-shaped or hoe-shaped projections enable the apparatus to be simplified, since they act to hold and pull down the bread dough, as well as to cut it by abutting each other.

As the apparatus can always cut and discharge a constant amount of bread dough, it makes later work easy. Thus, the apparatus can increase the yield when the cut bread dough is processed, to produce products such as bread dough balls smaller than the cut bread dough.

If the cut and discharged bread dough is joined to form a bread dough sheet of a constant thickness and width, and the sheet is then cut into a given shape to produce various kinds of products, the fluctuations in weight of the products can be reduced.

In conclusion, this invention can always continuously and accurately cut a constant amount of bread dough, to be supplied for a later process, from a mass of mixed bread dough, by rotating cutter blades and by eliminating slipping between the bread dough and the blades such that part of the bread dough is held and pulled down from its upper position to a lower position by the projections mounted on the front surfaces of the advancing blades, which are opposedly arranged at the lower opening of the hopper.

What is claimed is:

1. A method for continuously cutting and discharging a constant quantity of bread dough, including the steps of:

cutting the bread dough in a hopper and discharging the cut dough through a bottom opening of the hopper by rotating a rotary cutter comprising pairs of opposing rotary cutting blades disposed at the bottom opening, wherein projections are provided on front surfaces of the rotary blades, thereby preventing the bread dough from escaping into the upper part of the hopper and drawing the bread dough down from the hopper during the rotation of the cutting blades, whereby a constant quantity of the bread dough is always cut and discharged by the abutment and separation of the opposing cutting blades.

2. An apparatus for continuously cutting and discharging bread dough, comprising:

a hopper having a bottom opening dimensioned and positioned for discharging cut portions of the bread dough;

a rotary cutter comprising pairs of opposing rotary cutting blades rotatable mounted at the bottom opening, wherein projections are provided on front surfaces of the rotary blades such that a constant quantity of the bread dough can always be cut and discharged by eliminating slipping between the blades and the bread dough during rotation of said blades.

3. The apparatus of claim 2 wherein the projections are provided on peripheries of the blades.

4. The apparatus of claim 2 wherein a plurality of the projections are provided on each of the blades along its longitudinal direction at predetermined distances therebetween.

5. An apparatus of claim 2 wherein the projections are hoe-shaped or plane eave-shaped both along the longitudinal and tangential directions of the blades.

6. An apparatus of claim 5 wherein each of the projections comprises a plurality of comb-shaped projections.

7. The apparatus of claim 3 wherein a plurality of the projections are provided on each of the blades along its longitudinal direction at predetermined distances therebetween.

* * * * *